Oct. 14, 1941.                S. GABRIELSON                2,259,371
                      RESET FOR THERMAL DEMAND METERS
                            Filed Jan. 4, 1941
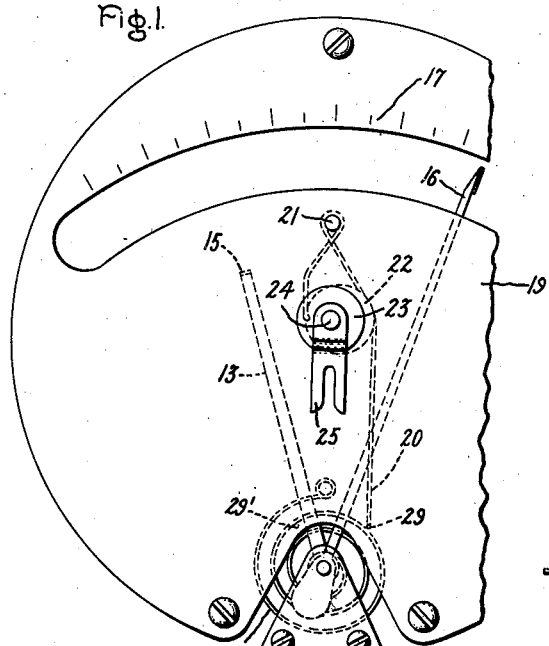
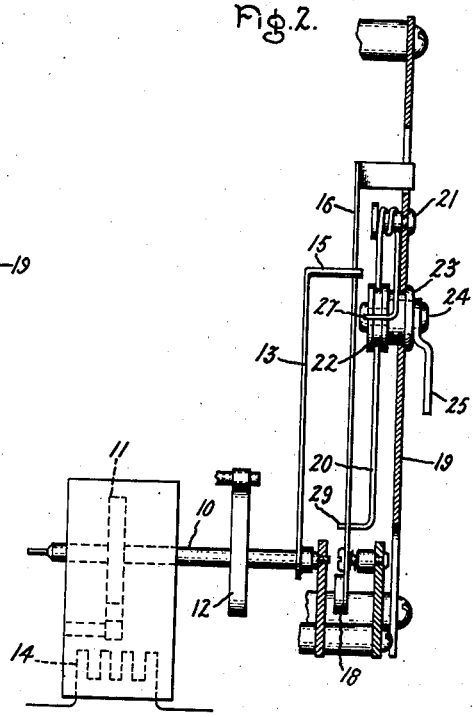
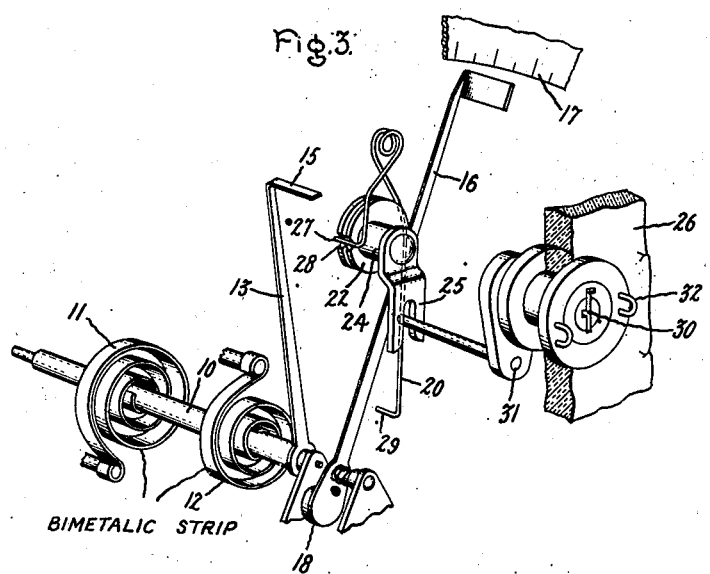
Inventor:
Samuel Gabrielson,
by Harry E. Dunham
His Attorney.

Patented Oct. 14, 1941

2,259,371

UNITED STATES PATENT OFFICE 2,259,371

RESET FOR THERMAL DEMAND METERS

Samuel Gabrielson, South Lynnfield, Mass., assignor to General Electric Company, a corporation of New York Application January 4, 1941, Serial No. 373,131

1 Claim. (Cl. 171—34)

My invention relates to a mechanism for resetting the maximum demand pointers of thermal demand meters and its object is to provide a mechanism which when operated to reset the demand pointer will leave the pointer in contact with the advancing dog irrespective of the measurement position of such dog at the time of reset.

The problem of resetting the friction pointer of a thermal demand meter differs from the problem of resetting the friction pointer of a block interval type of demand meter because with the thermal type of meter the advancing dog may have any measurement position at the completion of the resetting operation, and it is necessary to provide a resetting device which will accurately position the friction pointer in contact with the advancing dog when the latter is in any unrestrained measurement position. The resetting device is to be actuated without opening the meter and by only an authorized person.

The features of my invention which are believed to be novel and patentable will be pointed out in the claim appended hereto. For a better understanding of my invention, reference is made in the following description to the accompanying drawing in which Figs. 1, 2 and 3 respectively represent face, side and perspective views of the essential parts of a thermal demand meter provided with a preferred form of my resetting mechanism.

Referring to the drawing, 10 represents a shaft which has its rotary position determined by two thermally responsive bimetallic spirals 11 and 12. This invention is not concerned with the exact type or purpose of the thermal meter but for purposes of explanation it is here assumed to be a thermal ammeter compensated for ambient temperatures. Thus spiral 11 may be subjected to the heating of the current to be measured in the manner indicated in Fig. 2 where the spiral is encased with a heating resistance 14 through which the current to be measured flows. As this spiral is heated, it tends to rotate the shaft 10 in a clockwise direction as viewed in Figs. 1 and 3. Spiral 12 is subject only to ambient temperature and tends to rotate the shaft in the opposite direction with temperature rise to the extent necessary to offset the torque of spiral 11 due to ambient temperature rise alone. At the forward end of shaft 10 is a pointer advancing dog 13 and the shaft 10 and dog 13 will normally be positioned in accordance with the measurement condition or current flow in heater 14 and rotating clockwise with higher current flow.

The dog 13 has an offset finger 15 which can contact the down-scale side of a pointer 16 pivoted on the same axis with dog 13 and arranged to swing through a measurement arc with respect to a scale 17. The friction pointer will, therefore, be rotated clockwise and up-scale by the dog 13 when there is current flow in heater 14 to an extent depending upon the average current flow over a suitable time interval lag such as 15 minutes. When the current decreases and the dog returns down-scale, the friction pointer remains in the maximum up-scale position to which moved and at the end of a month or other suitable meter reading period will indicate on a scale 17 the maximum current demand over such period. 18 indicates a balancing weight for pointer 16. This pointer will be adjusted so as to be easily moved by the dog without producing erroneous displacement of the dog from its true measurement position.

The scale 17 is on a scale plate 19 which also supports my manual resetting device consisting of a resilient forked lever 20 pivoted on a pin 21, an eccentric cam 22 on a shaft 24 extending through a bushing 23 in plate 19. The shaft 24 is provided with a crank 25 by means of which the shaft 24 and cam 22 may be rotated. It will be noted that the eccentric cam 22 has a grooved surface and that the lever 20 consists of a stiff spring wire looped about post 21 and having arms extending below the pivot resiliently embracing opposite peripheries of the cam. The long arm rests in the groove on the right side of the cam and the short arm has an offset end 27 that, in the position of the cam shown, rests in a notch 28 on the left periphery of the cam.

The wire lever is bent to snugly grip the cam and have the end 27 snap into the notch 28 when in the normal idle position shown. The notch 28 with the end 27 of the wire lever serves to position the cam in the position shown which is the position to which the cam is returned after a resetting operation and is the position in which its operating lever 25 may be sealed.

The long end of the resetting lever 20 extends down well towards the pivot point of friction pointer 16, and has an offset end 29 extending into the path of rotation of pointer 16 on its up-scale side. In the sealing normal position of lever 20, the part 29 is just out of contact with the friction pointer when the latter indicates full scale.

It is now seen that when lever 25 is unsealed and rotated a complete revolution in either direction, the eccentric cam swings the resetting lever about its pivot at 21, first towards the left and then back again to the right to the position shown. During such movement, the pusher end 29 of the resetting lever moves to about the point 29', Fig. 1, and returns to the position shown. It is thus evident that the friction pointer 16 will be rotated counterclockwise into contact with dog 15 if not already in contact therewith, and that both pointer 16 and dog 15 will be returned to their down-scale zero or minimum measurement positions. It is possible to return the dog to the down-scale zero position, even though it has a different measurement position at the time, because of the resilient yielding nature of the bimetallic spirals 11 and 12.

In the final portion of the resetting operation when pusher 29 is returned to the position shown, the dog 15 and pointer 16 will follow it until the dog again returns to the true measurement position corresponding to the thermal measurement conditions of the meter. This return is of necessity sufficiently gradual that the friction pointer 16 remains in contact with the dog and there is no overshooting such as would occur if the dog and pointer were returned to zero and then simply released.

It is thus seen that this resetting device results in leaving the friction pointer against the dog and the dog in its true measurement position regardless of the measurement position of the dog at the time of reset. This is the result desired.

The resetting mechanism may be turned in either direction and it does no harm if it is accidentally turned more than a revolution, since, as will be explained, it is necessary to bring it to the sealing position shown in order to reseal the device. In the sealing position the resetting lever and its pusher are out of the way of friction pointer and the latter is free to assume its maximum indicating position without interference.

Any suitable sealing arrangement or its equivalent may be provided, and in Fig. 3 I have indicated a sealing arrangement suitable for the purpose. Here 26 represents the front cover for the meter. This cover may be of glass. Inserted through the cover in line with shaft 24 is a bushing containing a lock having a key hole 30. The lock is of a type in which only the correct key may be inserted and removed when the key hole is in a certain rotary position. Insertion of the key establishes driving relation with a crank 31 engaging in driving relation with the crank 25. Thus, the resetting operation is performed by inserting the proper key and turning it through 360 degrees and removing the key. In addition, provision may be made for passing an ordinary sealing loop over the key hole, and sealing wire hasps 32 are shown for this purpose on opposite sides of the key hole. It is evident that only an authorized person can perform the resetting operation and that it can only be performed in a correct manner.

What I claim as new and desire to secure by Letters Patent of the United States is:

In a maximum demand meter a friction pointer pivoted to swing through a measurement arc between zero and maximum measurement indicating positions, and means for resetting said pointer to a zero position from any other position comprising an eccentric cam having its axis of rotation parallel to the axis of rotation of said pointer, a forked lever formed by a loop of spring wire pivoted on one side of said cam and with arms of the loop resiliently embracing the cam on opposite peripheries thereof, one of said arms extending beyond the cam and having an offset end portion for engaging with said pointer during a resetting operation, the other arm having an offset end engaging a notch in the periphery of the cam when the latter is in normal idle position, and means for rotating said cam through a complete revolution from such position to oscillate said forked lever back and forth through an arc such that it will reset said friction pointer to zero position from any other indicating position and return the lever to idle position with the extended arm out of the measurement range of the pointer.

SAMUEL GABRIELSON.